(12) United States Patent
Srivastava et al.

(10) Patent No.: US 12,481,592 B2
(45) Date of Patent: Nov. 25, 2025

(54) SYSTEM AND METHOD FOR TRACING INSTRUCTION CACHE MISSES

(71) Applicant: NXP USA, Inc., Austin, TX (US)

(72) Inventors: Rajan Srivastava, Noida (IN); Sourav Roy, Kolkata (IN)

(73) Assignee: NXP USA, Inc., Austin, TX (US)

( * ) Notice: Subject to any disclaimer, the term of this patent is extended or adjusted under 35 U.S.C. 154(b) by 84 days.

(21) Appl. No.: 18/504,468

(22) Filed: Nov. 8, 2023

(65) Prior Publication Data

US 2024/0211405 A1 Jun. 27, 2024

(30) Foreign Application Priority Data

Dec. 26, 2022 (IN) .............................. 202221075681

(51) Int. Cl.
*G06F 12/08* (2016.01)
*G06F 12/0811* (2016.01)
*G06F 12/0875* (2016.01)

(52) U.S. Cl.
CPC ...... *G06F 12/0875* (2013.01); *G06F 12/0811* (2013.01); *G06F 2212/1021* (2013.01)

(58) Field of Classification Search
CPC .. G06F 12/08; G06F 11/3636; G06F 12/0875; G06F 12/0811; G06F 2212/1021; G06F 12/0837; G06F 12/0888
See application file for complete search history.

(56) References Cited

U.S. PATENT DOCUMENTS

| 5,999,721 A | 12/1999 | Colglazier |
| 6,002,875 A | 12/1999 | Stolberg |
| 10,031,833 B2 | 7/2018 | Mola |
| 11,620,224 B2 * | 4/2023 | Thyagarajan ......... G06F 9/3804 711/118 |

(Continued)

FOREIGN PATENT DOCUMENTS

| JP | H08263372 A | 10/1996 | |
| WO | WO-2006057685 A1 * | 6/2006 | ........... G06F 9/3848 |

(Continued)

OTHER PUBLICATIONS

S. Eyerman, J. E. Smith and L. Eeckhout, "Characterizing the branch misprediction penalty," 2006 IEEE International Symposium on Performance Analysis of Systems and Software, Austin, TX, USA, 2006, pp. 48-58.*

(Continued)

*Primary Examiner* — Pierre Michel Bataille

(57) ABSTRACT

A system on chip (SoC) architecture includes an integrated branch and cache hit-miss trace circuit operably coupled to a CPU core, a first trace circuit, and a cache hit-miss trace circuit. Following an occurrence of a cache-fetch instruction: the cache hit-miss trace circuit identifies whether the fetch instruction is a cache-missed instruction, and, in response thereto, sends a cache miss report message that includes a fetch instruction address to the first trace circuit. The first trace circuit is configured to identify whether the fetch instruction is a taken-branch instruction and creates a modified branch trace response message (BTM) that includes the fetch instruction address and sends the modified BTM to a create trace messages circuit. The modified BTM indicates an instruction address of the cache miss.

13 Claims, 4 Drawing Sheets

(56) References Cited

U.S. PATENT DOCUMENTS

| | | | |
|---|---|---|---|
| 2009/0077349 A1 | 3/2009 | Park et al. | |
| 2010/0211828 A1* | 8/2010 | Moyer | G06F 11/3636 714/E11.203 |
| 2013/0117843 A1* | 5/2013 | Komaromy | G06F 12/0875 726/22 |
| 2015/0006863 A1* | 1/2015 | McGowan | G06F 11/3636 712/234 |
| 2015/0006869 A1* | 1/2015 | Ehrlich | G06F 11/3636 712/244 |
| 2015/0046651 A1* | 2/2015 | Luttrell | G06F 12/0811 711/122 |
| 2021/0081297 A1* | 3/2021 | Weiss | G06F 9/323 |
| 2021/0173783 A1* | 6/2021 | Thyagarajan | G06F 9/3804 |
| 2023/0176971 A1* | 6/2023 | Mola | G06F 21/6245 711/141 |
| 2023/0350804 A1* | 11/2023 | Mola | G06F 11/3636 |
| 2024/0118895 A1* | 4/2024 | Zhang | G06F 9/30047 |
| 2024/0201998 A1* | 6/2024 | Abulila | G06F 9/3806 |
| 2024/0320127 A1* | 9/2024 | Ableidinger | G06F 11/3636 |

FOREIGN PATENT DOCUMENTS

| | | | | |
|---|---|---|---|---|
| WO | WO-2013070773 A2 * | 5/2013 | | G06F 11/3037 |
| WO | WO-2020219293 A1 * | 10/2020 | | G06F 3/0644 |
| WO | WO-2021118785 A1 * | 6/2021 | | G06F 12/0862 |

OTHER PUBLICATIONS

Z. Jun, M. Kui-Zhi and Z. Ji-Zhong, "CSDA: An Adaptive Data Storage Strategy for Predictive Branch Path on Multi-Core Architecture," 2010 10th IEEE International Conference on Computer and Information Technology, Bradford, UK, 2010, pp. 1695-1702.*

A. Kolli, A. Saidi and T. F. Wenisch, "RDIP: Return-address-stack Directed Instruction Prefetching," 2013 46th Annual IEEE/ACM International Symposium on Microarchitecture (Micro), Davis, CA, USA, 2013, pp. 260-271.*

* cited by examiner

SYSTEM AND METHOD FOR TRACING INSTRUCTION CACHE MISSES

CROSS-REFERENCE TO RELATED APPLICATIONS

This application claims the priority under 35 U.S.C. § 119 of India application Ser. No. 20/222,1075681, filed on 26 Dec. 2022, the contents of which are incorporated by reference herein.

FIELD OF THE INVENTION

The field of the invention relates to a system and method for tracing instruction-cache-misses. The invention is applicable to, but not limited to, tracing instruction-cache-misses to know which instructions in text are getting cache-thrashed.

BACKGROUND OF THE INVENTION

It is known that the performance of highly complex electronic devices requires the use of complex software. Often, complex software functions need to run periodically. In some use-cases, such as with cellular or WiFi™ wireless baseband signal processing, the baseband software processing system has to continuously perform a long list of software-controlled actions. This is notably not the case with Ethernet based communication systems or sensor-based systems, where software functions rarely need to complete their execution of all the required programs in a bounded (i.e., time-constrained) time period.

Such time-bounded software executions are typically required to comply with a particular protocol or standard that operates within defined timelines. For example, when a cellular base station asks a cell phone to send some data at precise time in the future, the third generation partnership project (3GPP™) standard expects that the cell phone will send the required data to the cellular base station precisely at the time when the base-station wants. Even a delay of a few microseconds is not tolerable in complex products and systems, such as wireless telecommunications. If the cell phone (i.e., the combination of its hardware (HW) and software (SW) together) fails to send the required data to the cellular base station at the above precise time, this delay breaks the 3GPP specified protocol and in most of the cases this delayed transmission of data from the cell phone will lead to problems at the base-station level. At an extreme level, if this failure happens many times, this could lead to a system failure. If a computer system, of a complex product such as a cell phone, is required to perform an operation within such bounded timelines, the HW and SW operations needed to meet the above 'punctuality' requirement is typically referred to as 'time-critical' or 'time-bound' or 'real-time' operations.

Often software designers tend to implement these time-bounded software actions using multiple, concurrent software threads. One side effect of the multi-software threading approach is a possible asynchronous pre-emption of the thread, depending on mutual priority of multiple software threads. This problem typically occurs as the time-bounded software executions fall into separate categories (e.g., applications) and are, hence, maintained by different software teams. For example, some functions perform system software tasks (such as memory management, inter-process communication, communication scheduling, interrupt processing) whereas some software functions are focused on protocol stack aspects of the wireless communication. In a typical software team, the organization of software engineers or protocol engineers are rarely involved in or understand the system software, and vice versa.

A lot of complex electronic devices employ System on Chip (SoC), which often use a cache that is a small-sized fast memory, generally part of the central processing unit (CPU) and located between the CPU cores and the main memories. Since cache memory has much smaller storage than main memory and is generally part of the CPU sitting between the CPU cores and the main memories, not all the contents of main memory can be stored in cache memory. Therefore, the cache is used to store the frequently accessed program text and data. If new content is to be copied into the cache, and cache memory doesn't have free space, CPUs typically implement a cache-replacement logic, whereby this replacement logic evicts contents of some cache regions to make space for new data coming from main memory.

If the above cache-replacement happens very frequently for a given region(s) of the cache, it is referred to as a specific cache region(s) that is undergoing a 'cache-thrashing' situation. A cache-thrashing event also refers to a situation whereby the text and data for a piece of code that needs to be executed should remain in caches. If some unwanted text or data replaces the executed text or data already in cache, this kind of cache eviction is also referred to as cache-thrashing. Cache-thrashing is not a deterministic event; hence, when it occurs, it makes the timely execution of such code indeterministic.

Furthermore, with products that use complex software, it is often the case that a software designer attempts to fine-tune the performance of time-critical code in one software release, and then in later releases some new code is added. However, if the later software releases start to show a delay in the execution of code, it is difficult to know if the additional, new code has added to latency or whether the existing code has started to encounter cache-thrashing.

To address the above scenarios, a software developer must write a high-level code that organizes the addresses (via linker-script) and places 'time-critical functions' to one side such that the time-critical functions do not undergo cache-thrashing. Note that linker-scripts are created, configured and modified by software engineers; the linker script is then used by software-compiler to generate the object code of the software-program. Linker-scripts informs the compiler which program instruction to use which addresses in memory.

Eliminating or reducing instruction cache thrashing is generally achieved by relocating the addresses of time-critical code to avoid conflict with other frequently-executed code. Re-location is relatively straightforward if the software is single threaded and owned by a single software designer team. However, in complex software-based products, such as baseband signal processing in wireless products, there are multiple software sub-components and therefore multiple parallel software threads running on a processor core. In such a case, finding which code is executing more frequently than other code becomes very difficult using code reviews (sometimes referred to as (code) instruction tracing).

It is known that an existing technique of instruction tracing (e.g., Nexus™) can trace a function-call sequence and can inform a core (main) processor as to which functions are invoked and how frequently. However, it is currently impossible to identify which function-calls (or part of a function calls) amongst the time-critical functions incurred cache-misses.

To execute code, the CPU core keeps on fetching instruction or data from memory-subsystem(s). A memory-subsystem first searches for the requested information in the cache-memory. If the cache-memory reports an absence of the requested information (instruction or data), this event is referred to as a 'cache-miss'. Once a cache-miss event occurs, a memory-subsystem fetches the CPU core the requested information from the main memory. Existing techniques (widely used by most of the CPU architectures) simply increment statistics' counters when a cache-miss event occurs.

Here, instruction tracing refers to the logging of assembly instructions that are executing on the central processing unit (CPU). That means, if a CPU executes assembly instructions between two points in time, a 'logger' will record which instructions were executed between the two points in time in the log-memory. The logger maintains the order in which instructions were executed. Also, here, tracing 'function call sequence' encompasses performing the instruction logging and then mapping those executed instructions to the function names so that there is an understanding of what order various functions in the code executed, i.e., which functions invoked other functions.

U.S. Pat. No. 5,999,721A describes a mechanism that looks for cache-hit-miss instruction addresses and only captures cache-miss events.

Accordingly, there is a need for an improved system and method for tracing 'instruction cache misses'.

SUMMARY OF THE INVENTION

Examples of the present invention provide a system and method for tracing 'instruction cache misses', as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
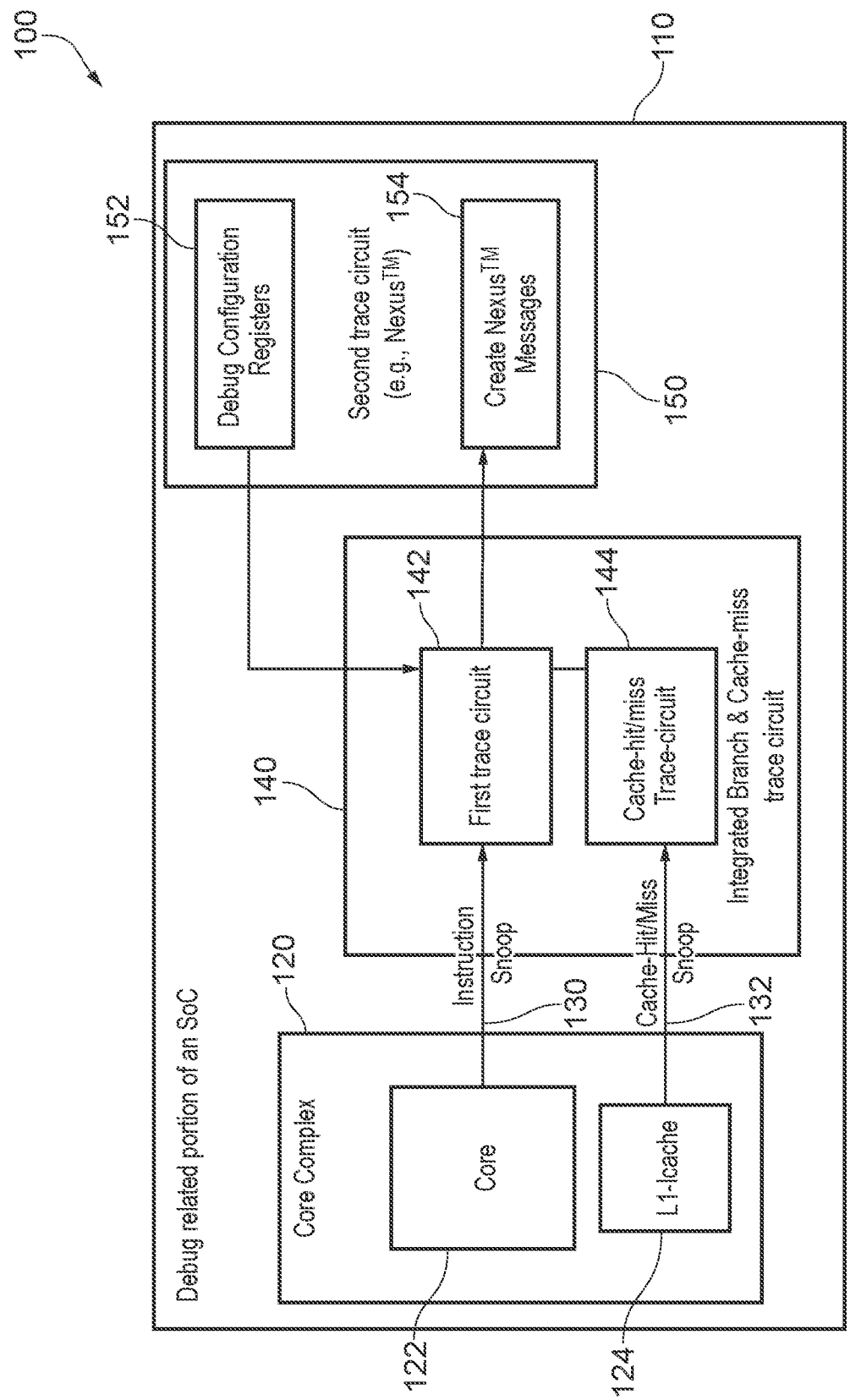
FIG. 1 illustrates a simplified known drawing of a system on chip (SoC) architecture that includes a debug related function.

In a first example of the present invention, a central processing unit, CPU, core coupled to an instruction cache controller controlling at least a one layer cache is provided, where the CPU core comprises at-least-one-layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and an integrated branch and cache hit-miss trace circuit operably coupled to the CPU core and comprising a first trace circuit and a cache hit-miss trace circuit. In response to an occurrence of a cache-fetch instruction, the cache hit-miss trace circuit is configured to identify whether the fetch instruction is a cache-missed instruction, and in response to the fetch instruction being identified as a cache-missed instruction, the cache hit-miss trace circuit is configured to send a cache miss report message that includes a fetch instruction address to the first trace circuit. The first trace circuit is configured to identify whether the fetch instruction is a taken-branch instruction and when the fetch instruction is a taken-branch instruction creates a branch trace message, BTM. In response to a received cache miss report from the cache hit-miss trace circuit, the first trace circuit includes the fetch instruction address in a modified BTM and sends the modified BTM to the core processor, wherein the modified BTM indicates an instruction address of the cache miss.

In this manner, through provision of the cache hit-miss trace circuit is configured to identify whether the fetch instruction is a cache-missed instruction and in response thereto sends a cache miss report message that includes a fetch instruction address to the first trace circuit, it is possible to obtain a trace of instruction-execution along with cache-miss details.

Furthermore, examples of the claimed invention may provide a mechanism to trace a function call sequence along with the information of which parts of the code have been cache-missed. In this manner, a mechanism is provided to enhance the first trace circuit (sometimes referred to as 'program trace logic') in a debug-IP of SoC in order to detect which instruction has been subjected to a cache-miss and report such instruction addresses to a trace-IP circuit. In particular, examples of the invention may enhance the Nexus interface (IEEE ISTO 5001: Processor Debug Interface) in order to create a new type of messaging, for example referred to as a 'branch and Cache_miss trace', where an existing BTM message 'Branch Trace Message' of Nexus interface may be modified and enhanced to include an instruction cache miss indicator and instruction cache miss address in a modified BTM.

In some examples the additional trace information may be used off-line to identify which code is executed during time-critical phases and which code incurred instruction misses; and modify an associated linker-script so that multiple time-critical codes do not try to compete for the same cache line.

In order to optimize the software code to reduce instruction-cache-thrashing in time-critical code, it is proposed that a software engineer should obtain enough debug information from the trace-log that is able to inform which instructions were executing during time-critical execution phase and which of those instructions incurred one or more cache-miss(es). Time-critical code here refers to the software instructions that must complete their execution within the system defined timeline. Knowing cache-miss related statistical counters alone is insufficient for the reduction of cache-thrashing of the desired piece of code.

Examples of the present invention, also provide a system on chip, SoC, architecture, which may be located on a single integrated circuit, that comprises: a central processing unit, CPU, core coupled to an instruction cache controller controlling at least a one layer cache is provided, where the CPU core comprises at-least-one-layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and an integrated branch and cache hit-miss trace circuit operably coupled to the CPU core and comprising a first trace circuit and a cache hit-miss trace circuit. Following an occurrence of a cache-fetch instruction, the cache hit-miss trace circuit is configured to identify whether the fetch instruction is a cache-missed instruction and in response thereto sends a cache miss report message that includes a fetch instruction address to the first trace circuit; and the first trace circuit is configured to identify whether the fetch instruction is a taken-branch instruction and when the fetch instruction is a taken-branch instruction creates a branch trace message, BTM, and, in response to a received cache miss report message from the cache hit-miss trace circuit, the first trace circuit includes the fetch instruction address in the BTM that creates a modified BTM and sends the modified BTM to a create trace messages circuit, wherein the modified BTM indicates an instruction address of the cache miss.

Although examples of the invention are described with reference to a layer-1 cache, it is envisaged that this specific application simplifies the explanation of the concepts described. The concepts herein described are equally applicable if the SoC includes a L2 cache or L2 and higher layer caches as well a layer 1 cache. In case of multi-layered cache SoCs (i.e., with L1, L2, . . . caches), cache-miss information in the proposed 'branch and cache-miss message' may be extended to include whether the cache-miss happened at a layer 1 (L1) cache or a layer-2 (L2) cache or any higher layer caches. In a multi-core SoC, the proposed instruction cache-miss information may be accompanied with the core on which instruction-cache miss occurred.

In the context of the present invention, the phrase tracing 'function call sequence' encompasses a SoC performing the instruction logging and then mapping those executed instructions to map to the function names so that knows what order various functions in the code executed one another. For example, let us assume that a software program has the following functions in the code: main( ), f1( ), f2( ), f3( ), f4( ). The program will define which function invokes which other function, for example the main( ) invokes f1( ), f1( ) invokes f2( ), then f2( ) invokes f3( ), and then f1( ) invokes f4( ). This example is one very simple example of a function call sequence, as understood by a skilled artisan.

In the context of the present invention, the expression 'tracing', encompasses a logging sequence of instruction execution and instruction cache-miss events in an order of their occurrences. In the context of the present invention, the expression 'Instructions' encompasses a high-level code that is compiled by a compiler and converted into assembly instructions. Thus, in the context of the present invention, the expression 'instruction tracing' encompasses a logging of assembly instructions that are executing on the CPU. That means, if a CPU executes some assembly instructions between two points in time, the 'logger' will write into the log-memory, those assembly instructions that were executed between the two points in time and the logger will maintain the order in which those assembly instructions were executed.

Referring now to FIG. 1, a simplified known drawing of a system on chip (SoC) architecture 100 is illustrated that includes a debug related function. The debugging ('debug') related portion 110 of an SoC comprises a CPU Core Complex 120. The CPU Core Complex 120 includes a core processor 122, and a layer-1 ('L1') cache 124 (e.g., an instruction cache). The CPU Core Complex 120 is a hardware circuit inside the SoC architecture 100 that houses the CPU core L1 instruction cache, L1 data cache. It is noted that the CPU core complex 120 is shown inside portion 110 of an SoC only to make the figure simplified and informative to the reader; whereas generally the CPU core complex may be located separate from the debug logic in the SoC.

The L1 cache 124 represents a L1 cache (Icache) controller hardware that houses the cache memory and hardware logic to search the cache for the given address. When the core wants to execute the next instruction, the core sends the address of the next instruction to the L1 cache 124 (Icache) and expects the L1 cache 124 (Icache) to inform the CPU Core Complex 120 whether: (a) the instruction-address is present in the L1 cache 124 (Icache) (a so-called 'cache-hit event'); or (b) the instruction cache doesn't contain the requested instruction-address (a so-called 'cache-miss').

The core processor 122 sends out an instruction snoop message 130 to a first trace circuit 142 of an Integrated Branch and Cache-miss trace circuit 140. The Integrated Branch and Cache hit-miss trace circuit 140 comprises logic circuits referred to as a first trace circuit 142 and a Cache hit-miss trace circuit 144, which work in tandem.

When the core processor 122 executes any assembly instruction, the first trace circuit 142 keeps on 'snooping' into the core processor 122 to see which instruction is being executed. The output of the snoop is the program address (e.g., a Program Counter) of the actual executed instruction (but does not output the assembly instruction). For every executed instruction, an 'Instruction snoop' interface passes the address of the executed instruction to the first trace circuit 142.

The layer-1 ('L1') cache 124 sends out a message via a cache-hit-miss snoop interface 132 to a cache hit-miss trace circuit 144 of the Integrated Branch and Cache-miss trace circuit 140.

The Integrated Branch and Cache-miss trace circuit 140 is connected to a second trace circuit 150 (e.g., a Nexus trace circuit). The second trace circuit 150 comprises debug configuration registers 152 and a create trace messages circuit 154 (e.g., create Nexus Messages). Any hardware circuit requires some registers, such as the debug configuration registers 152, so that the software is able to program and customize that hardware circuit to customize the actions to be performed by that hardware circuit. For example, a user may want to track only cache hit and miss counters (not shown). In another debug session, the user may want to see the instruction trace log only. Therefore, according to an user's debug requirement, the user is able to program the functionality of the debug configuration registers 152 before starting a debug operation.

An SoC needs to send out the debug logs (also called 'debug traces' or 'traces') to a JTAG debugger using the known JTAG interface (https://en.wikipedia.org/wiki/JTAG). This debug information should be sent from the SoC to the JTAG debugger using standard format messages so that the SoC from a different manufacturer is able to debug the standard format message using the JTAG-debugger of another manufacturer. Thus, in FIG. 1, the Create Nexus Messages circuit 154 collects the debug information from the first trace circuit 142, where this incoming information is typically in the SoC's proprietary format. The Create Nexus Messages circuit 154 formats the debug information into Nexus's standardized format and sends these Nexus format messages to external JTAG debugger (not shown) via a JTAG interface (not shown).

Mapping from the instruction address to actual instruction is performed off-line (i.e., later on) on a host computer instead of performing this mapping on the target-device-under-test.

In operation, the L1-Icache circuit 124 informs the Cache hit-miss trace circuit 144, via the cache-hit-miss snoop interface 132, that one instruction-cache-miss event occurred. In cache-hit cases, the cache hit-miss snoop interface sends a 'cache-hit' notification to the cache hit-miss trace circuit 144. In cache-miss cases, the cache hit-miss snoop interface sends a 'cache-miss' notification to the cache hit-miss trace circuit 144. Whenever the cache hit-miss trace circuit 144 receives a cache-miss or cache-hit notification via the cache-hit-miss snoop interface 132, the cache hit-miss trace circuit 144 increases the appropriate statistics-counters (not shown). When first trace circuit 142 receives a command from the cache hit-miss trace circuit 144, the first trace circuit 142 sends the following information to the cache hit-miss trace circuit 144: the contents of a trace-log memory; and statistics-counters of cache-miss-trace-block.

Trace log is a memory buffer that stores a sequence of instruction-addresses, these instructions are the ones that are executed by the core when user starts an instruction-trace debug. In essence, users desire more and more logs during instruction tracing (i.e., users want to debug longer durations of execution of their program). As will be appreciated, the larger the trace-log memory the more history the user has access to in determining what exactly executed on the cores.

Figure 2:
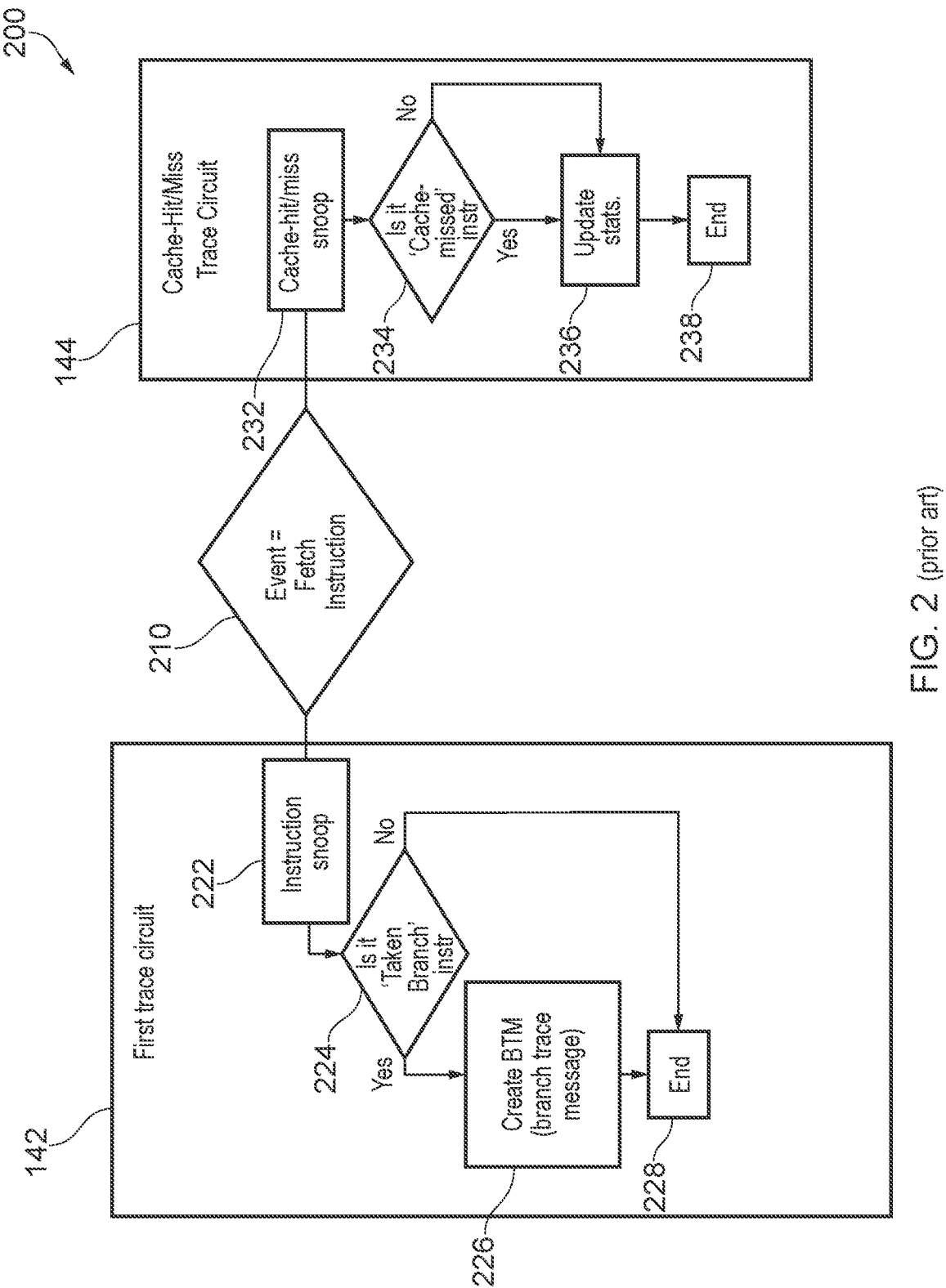
FIG. 2 illustrates a simplified known flowchart of a run-time flow of instructions and cache-miss tracings.

Referring now to FIG. 2, a simplified known flowchart 200 of a run-time flow of instructions and cache-miss tracings of debug related events that happen at run time inside the debug related circuits inside the SoC 100 of FIG. 1 is illustrated. When the core complex 120 is put into an instruction trace debug mode of operation, each instruction execution triggers the flow described in FIG. 2.

Whenever a CPU core wants to execute a next instruction, the core must first bring the next instruction from memory to inside the core. To effect this, the core internally performs the following actions: the Core computes the address of the next instruction to be executed and the Core sends the above instruction address to L1-Instruction-cache 124 of FIG. 1 to fetch the instruction stored at that address. When the core performs this latter operation, it is often termed a 'cache-fetch Instruction'. The flowchart starts at 210 with an occurrence of a 'cache-fetch Instruction' at the core, then the L1-Icache 124 of FIG. 1 is able to respond with a cache hit or cache miss result and executed.

In a first trace circuit 142, referred to in some applications as program trace logic 142, an Instruction snoop is performed at 222. A determination is then made as to whether a 'taken branch' instruction has been received at 224. Note that program tracing is performed by CPUs by logging only the branch types of assembly instructions. If a 'taken branch' instruction is not determined, the first trace circuit 142 ends this operation at 228; otherwise, if a 'taken branch' instruction is identified, a branch trace message (BTM) is created at 226 and appends this instruction-address in the instruction trace log and the first trace circuit 142 ends this operation at 228.

Concurrently, following an occurrence of a 'cache-fetch Instruction' at 210, the cache hit-miss trace circuit 144 performs a cache-hit-miss snoop at 232. A determination is then made as to whether a Cache-missed' instruction has been received at 234, which identifies the statistics' counter to update (i.e., whether a cache-hit counter or a cache-miss counter), and then informs the appropriate counter circuit 236 that updates the appropriate counter and the cache hit-miss trace circuit 144 ends at 238.

Figure 3:
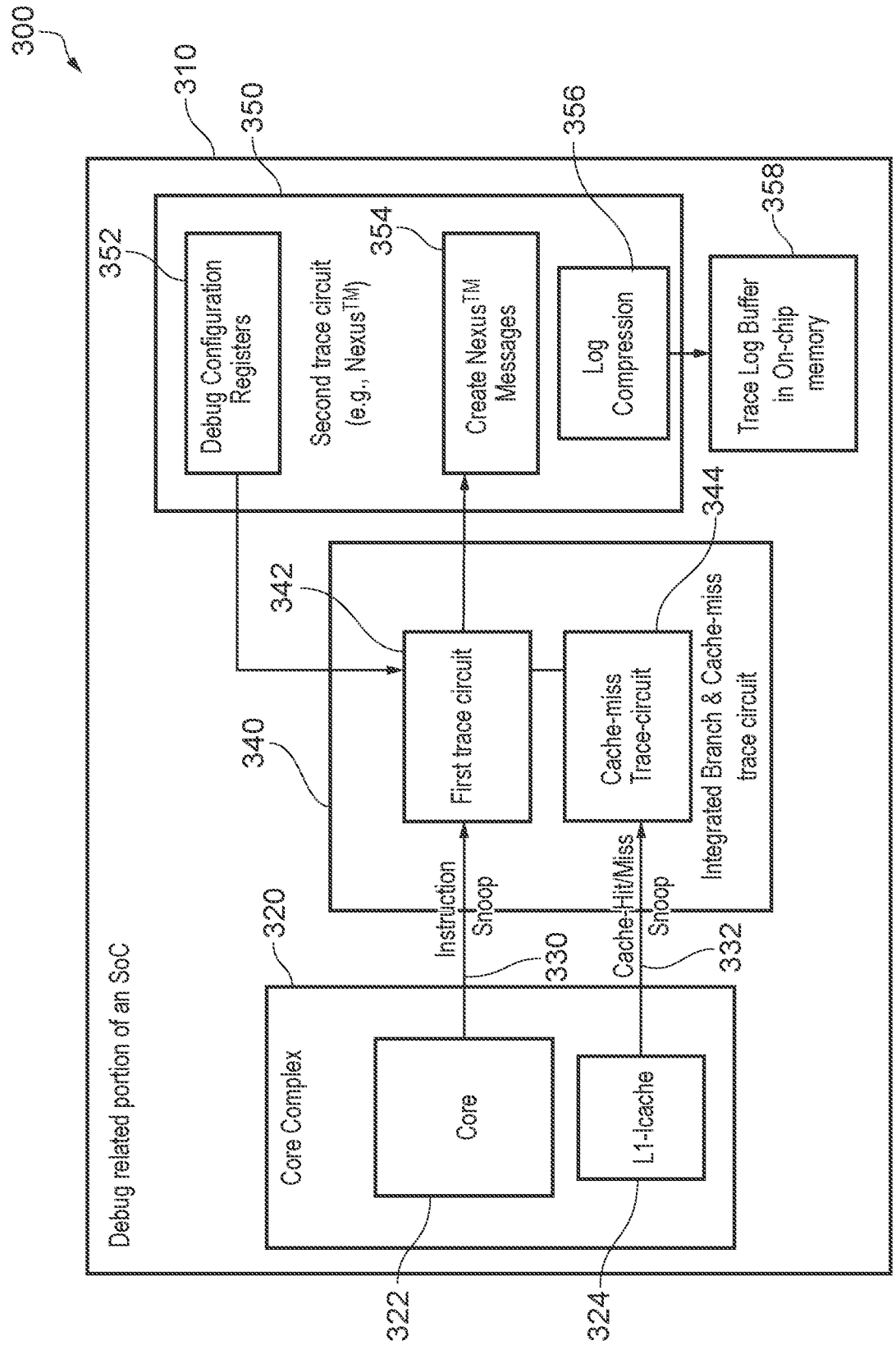
FIG. 3 illustrates one example of a system on chip (SoC) architecture that includes a debug related function, according to example embodiments of the invention.

Referring now to FIG. 3, one example of a system on chip (SoC) architecture that includes a debug related function, according to example embodiments of the invention is illustrated. The debugging ('debug') related portion 310 of an SoC comprises a CPU Core Complex 320. The CPU Core Complex 320 includes one core processor 322 (e.g., ARM™ core, PowerPC cores such as e200™ and Intel™ x86™ or any other core) (or all cores in multi-core SoCs), and a layer-1 ('L1') cache 324, (e.g., an instruction cache). In this example, the CPU Core Complex 320 is a hardware circuit inside the SoC architecture 300, and houses the CPU core L1 instruction cache, L1 data cache. Although the CPU Core Complex 320 is shown having only one L1 cache 324, it is known that some CPU cores have L1 and L2 caches, and some CPU cores have L1, L2 and L3 caches (not shown for simplicity purposes only).

Thus, although examples of the invention are described with reference to a layer-1 (L1) cache, it is envisaged that the concepts herein described are equally applicable if the SoC included a multi-layered cache, e.g., also includes a L2 cache or a L2 and higher layer caches as well a layer 1 cache. In case of multi-layered cache SoCs (i.e., with L1, L2, . . . caches), it is envisaged that cache-miss information in the proposed 'branch and cache-miss message' may be extended to include whether the cache-miss happened at a layer 1 (L1) cache or a layer-2 (L2) cache or any higher layer caches. In a multi-core SoC, the proposed instruction cache-miss information may be accompanied with the core on which instruction-cache miss occurred.

The L1 cache 324 is typically split into an L1 Instruction cache and a L1 Data cache, and examples discussed herein are focused only on the L1 instruction cache. The L1 cache 324 represents a L1 cache (Icache) controller hardware that houses the cache memory and hardware logic to search the cache for a given address. When the core wants to execute the next instruction, the core sends the address of the next instruction to the L1 cache 324 (Icache) and expects the L1 cache 324 (Icache) to inform the core whether: (a) the instruction-address is present in the L1 cache 324 (Icache) (a so-called 'cache-hit event'); or (b) the instruction cache doesn't contain the requested instruction-address (a so-called 'cache-miss').

The core processor 322 sends out an instruction snoop message via the instruction snoop interface 330 to a first trace circuit 342, of an Integrated Branch and Cache-miss trace circuit 340. When core processor 322 executes any assembly instruction, the first trace circuit 342 keeps on 'snooping' into the core processor 322 to see which instruction is being executed. The output of the snoop is the program address (e.g., a Program Counter) of the actual executed instruction (not the assembly instruction). For every executed instruction, an 'Instruction snoop' interface passes on the address of the executed instruction to the first trace circuit 342.

The layer-1 ('L1') cache 324 sends out a message via cache-hit-miss snoop interface 332 to a cache hit-miss trace circuit 344 of the Integrated Branch and Cache-miss trace circuit 340. The Integrated Branch and Cache-miss trace circuit 340 comprises logic circuits referred to as a first trace circuit (and for some applications referred to as program trace logic) 342 and a Cache hit-miss trace circuit 344, which work in tandem.

Known first trace circuits (e.g., first trace circuit 142 of FIG. 1) are arranged to trace taken-branches. In accordance with examples of the invention, the first trace circuit 342 is additionally configured to provide an indication if the 'taken-branch' instruction was a cache-miss. Furthermore, the generated trace is arranged to additionally include a non-branch cache-miss instruction if reported by the modified cache hit-miss trace circuit 344. Furthermore, in accordance with examples of the invention, the first trace circuit 342 is additionally configured to compress the trace-log memory for the non-branch cache-miss instruction.

In accordance with examples of the invention, the cache hit-miss trace circuit 344 is configured to gather the instruction-address that caused the cache-miss. In addition, the cache hit-miss trace circuit 344 is configured to report this instruction-address to the modified first trace circuit 342.

The Integrated Branch and Cache-miss trace circuit 340 is connected to a second trace circuit 350 (e.g., a Nexus trace circuit). The second trace circuit 350 comprises debug configuration registers 352 and a create trace messages circuit 354 (e.g., create Nexus Messages). In accordance with examples of the invention, the modified debug-configuration registers 352 are configured to comprise at least one new bit that is configured to allow a user to enable cache-miss tracing in the SoC 300. Thus, for example using the debug configuration registers 352, if a single bit is set by the debugger to, say, a '0', it may be understood that a new debug operation in accordance with the concepts herein-described is enabled in the SoC 300, otherwise, if the one bit is not set by the debugger, the new debug operation is disabled in the SoC 300.

In accordance with examples of the invention, an SoC is configured to send out debug logs (which can be considered as 'debug traces' or 'traces') to an external debugger (not shown), say a JTAG debugger using the known JTAG interface (https://en.wikipedia.org/wiki/JTAG). For example, the debug information contained in the debug logs may be sent from the SoC to a JTAG debugger using standard format messages, so that the SoC from a different manufacturer is able to debug the standard format message using the JTAG-debugger of that particular manufacturer. Thus, in FIG. 3, the create trace messages circuit 354 (e.g., Nexus Messages circuit) collects the debug information contained in the debug logs from the first trace circuit 342, where this incoming information is typically in the SoC's proprietary format. The create trace messages circuit 354 (e.g., create nexus messages circuit) formats the debug information into Nexus's standardized format and sends these Nexus format messages to the external debugger, say a JTAG debugger (not shown) via a JTAG interface (not shown).

In some examples, the mapping from the instruction address to the actual instruction may be performed off-line (i.e., later on) on a host PC instead of performing the mapping on the target-device-under-test.

In operation, the L1-Icache circuit 324 informs the cache hit-miss trace circuit 344, via the cache-hit-miss snoop interface 332, that one instruction-cache-miss event occurred. In cache-hit cases, the cache hit-miss snoop interface 332 sends a 'cache-hit' notification to the cache hit-miss trace circuit 344. Whenever the cache hit-miss trace circuit 344 receives a cache-miss or cache-hit notification via the cache-hit-miss snoop interface 332, the cache hit-miss trace circuit 344 increases the appropriate statistics-counters (not shown).

When the first trace circuit 342 receives a command from the cache hit-miss trace circuit 344, the first trace circuit 342 sends the following information to the cache hit-miss trace circuit 344: the contents of a trace-log memory; and statistics-counters of cache hit-miss trace circuit 344.

In addition to the above responsibilities, the first trace circuit 342 may be responsible for accumulating and logging debug information that includes "Instruction snoop" events emanating from Core(s) 320 via the instruction snoop interface 330. For accumulation of these events, the first trace circuit 342 uses a trace-log (e.g., a memory or buffer recording trace log information that is located inside this circuit or elsewhere).

In some examples, a trace-log memory may be located inside the SoC 300 itself, where logging will be faster than when the trace-log memory is located outside the SoC 300. Trace-log memories are generally maintained inside the SoC 300 as it makes logging faster in comparison to performing logging in a memory outside the SoC 300. Memories inside the SoCs are always much more costly than external memories, hence a designer recognizes that a trace-log memory size must be kept as small as possible in order to keep the SoC 300 cost lower. Thus, in order to store more information in a limited space of trace-log memory in accordance with examples herein-described, the core(s) 320 may be configured to apply compression on the instruction traces using, say, one or more compression algorithms located in log compression circuit 356 used to suppress instruction trace address(es). For example, let us consider an example of 32 bit addressing in SoC, with 32 byte cache-line size. Generally, each address is 32 bits long. However, if memory addresses are identified at a cache-line-size granularity, then such addresses will always have 5 LSBs as zeros. Thus, in accordance with examples herein described that stores addresses in cache-line-size granularity, addresses of the instructions in an instruction trace log will also have 5 LSBs always zero. Hence, examples herein-described suppress these 5 address bits from, say, the LSBs of each instruction-address in the trace log.

Preferably, the compression algorithms should be standardized ones, so that the logs can be uncompressed by third-party software vendors.

Any hardware circuit requires some registers, such as the debug configuration registers 352, so that the software is able to program and customize that hardware circuit. For example, a user may want to track only cache hit and miss counters (not shown). In another debug session, the user may want to see the instruction trace log only. Therefore, according to a user's debug requirement, the user may be provided with the ability to program the functionality of the debug configuration registers 352, for example before starting a debug operation.

Cache miss notifications cause a performance drop off, as well as indeterminism to timely completion of actions for time-critical functions. Reducing or removing cache-misses becomes a complex problem in time-critical systems, such as time-critical wireless systems, where a lot of functions need timely execution. In essence, it is difficult for the core(s) 320 to understand the function-call-sequence and it is difficult to know which functions require cache more desperately than other functions. In order to reduce or remove cache-misses, the software developer should know: a) an exact function call sequence; and b) which performance and time critical functions are undergoing cache-misses. In accordance with examples herein-described, the first trace circuit 342 is configured to additionally capture cache-miss instructions. Since the increased logging will create pressure on log-space size, an improvement is also proposed in the compression applied to the trace-log memory, for example by including a log compression circuit 356 used to suppress instruction trace address(es).

Thus, in accordance with some examples, a program may be executed that impacts throughput and/or time-critical cases. After the software has been executed, the instruction trace log is taken from the SoC 300 (e.g., via the Nexus™ trace interface) to a host computer (not shown in drawings). The instruction trace may now be correlated with symbol tables of the compiled program using existing custom programs in order to identify 'critical' functions that are undergoing a cache-miss event. A determination may then be made as to whether the number of cache-misses are acceptable. If the number of cache-misses is not acceptable, then the linker script may be updated by, say the software programmer. Any time-critical function may then be relocated in the memory to avoid conflicts with other time-critical functions. If the number of cache-misses is acceptable, it indicates that the software code is meeting the performance and timing-constraints and the optimization exercise ends.

It will be difficult to tell deterministically which iteration of the software task T1 will take how much time. If it is desired that the software task T1 always completes fast and within a known bounded time: it is important to ensure that all the required text/data for T1 first resides in the cache.

Examples herein-described provide a mechanism to generate instruction cache-miss information. A skilled artisan will readily appreciate that a software engineer may want to use this additional information in any number of ways, for example to optimize a software program to reduce instruction cache misses. One example usage of many envisaged is that a software programmer may enable instruction tracing from a beginning to an end of a time-critical-phase of execution. Once the execution of time-critical actions is complete, the trace log may indicate the following sequence of software subroutine executions in time-critical phase:

function 1( ),
function2( ), cache-missed
function3( ),
function4( ),

The above trace log indicates that function2( ) has undergone a 'cache-miss' event. The software programmer will now have to decide, for example, if function2( ) must be made a cache-hit: if yes, then the software programmer may have to assign an appropriate address to function2( ) so that function2( ) remains in the cache. Address assignment to software subroutines is usually performed via linker scripts.

An instruction trace log is in memory (within the SoC) that stores the sequence of instruction-addresses, these instructions are the ones that are executed by the core when user started an instruction-trace debug. In some examples, after implementing the concepts described herein, the instruction-trace-log size will increase. Hence, the trace-log memory will be exhausted quickly. Therefore, in accordance with some examples, it is important to implement stronger compression of the stored trace log using log compression circuit 356 used to suppress instruction trace address(es) so that more and more trace logs can be retained in the on-chip memory 358.

In order to profile cache-misses, it is important to know the function call sequence, noting that the exact execution flow inside the functions is not needed (in other words, the exact instruction address is not needed for cache-miss profiling). Rather, it is important to know which cache-lines are cache-missed. In examples of the invention, the inventors have recognized and appreciated that there is no need to record the entire instruction-address. Instead, in one example, it is proposed that unwanted least significant bits (LSBs) of the instruction-address may be removed. Furthermore, it is known that most programs do not use the full address-range that is supported by the core processor. Therefore, it is also proposed that unwanted most significant bits (MSBs) of the instruction-address may be removed. In this manner, the trace logging can be compressed, as traces exhaust the limited amount of trace memory very quickly.

In a first example of trace log compression, the log compression circuit 356 suppresses the address's LSBs, for example to align with a cache-line-size of the trace log buffer in the on-chip memory 358 that is sent and stores the address of the cache miss. This means that cache-miss tracing only needs to know a cache-line-address. Thus, it is possible to compress the address by removing, say, 5 bits of LSBs from the address if the cache-line-size is 32 bytes.

In a second example, an alternative (or additional) proposed log compression circuit may be configured to suppress the address's MSBs from the address-bits. In 32 bit addressing CPUs, as an example, the program/text is generally not spread across the full 32 bit addresses.

The aforementioned compression of the cache-miss address is useful in that in most SoCs, a very small portion of the full address space is allocated to on-chip random access memories (RAM), and the rest of the SoC memories are designed in hardware for use of other purposes than on-chip RAMs. Consequently, and in general, the only possible address ranges for instructions will be the ones allocated to on-chip memories. Hence, examples herein-described aim to exclude unwanted MSB bits from the addresses of instructions whilst storing the instruction trace log.

Figure 4:
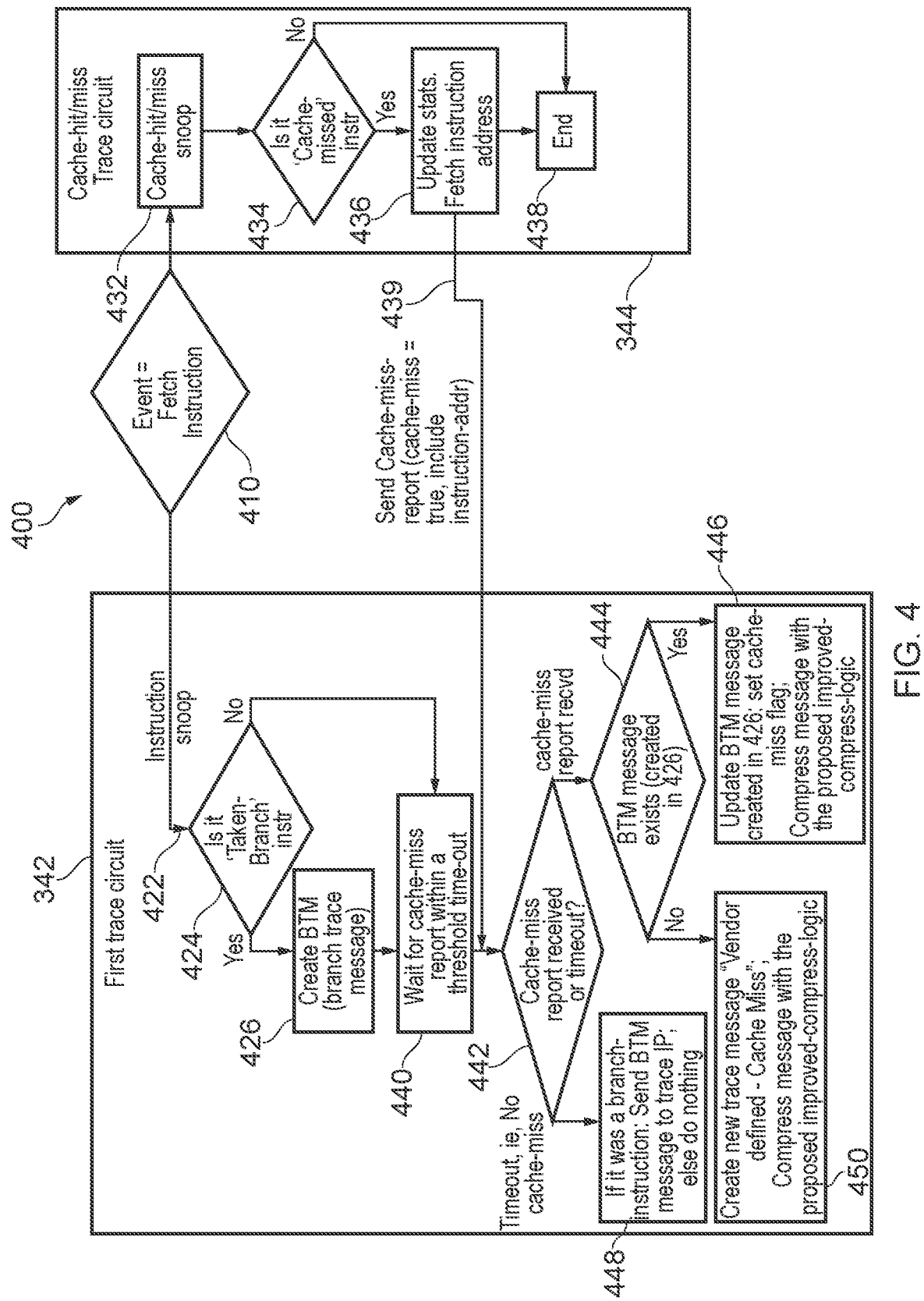
FIG. 4 illustrates one example of a flowchart of a run-time flow of instructions and cache-miss tracings, according to example embodiments of the invention.

FIG. 4 illustrates one example of a flowchart of a run-time flow of instructions and cache-miss tracings of debug related events that happen at run time inside the debug related circuits inside the SoC 300 of FIG. 3 is illustrated, according to example embodiments of the invention. When the SoC 300 is put into a debug mode of operation, each instruction execution triggers the flow described in FIG. 4.

Whenever a CPU core wants to execute an instruction, the core must first bring the next instruction from memory to inside the core. To effect this, the core internally performs the following actions: the Core computes the address of the next instruction to be executed and the Core sends the above instruction address to at least one layer-Instruction-cache 324 to fetch the instruction stored at that address. When the core performs this latter operation, it is often termed a "Fetch Instruction" event. The flowchart starts at 410 with an occurrence of an event that is a 'Fetch Instruction'.

In a first trace circuit 342, referred to in some applications as program trace logic, an instruction snoop is performed at 422. A determination is then made as to whether a 'taken branch' instruction has been received at 424. If a 'taken branch' instruction is not determined, the first trace circuit 342 moves to 440 where it waits for a cache miss report within a SoC threshold time-out; otherwise, if a 'taken branch' instruction is identified, a branch trace message (BTM) is created at 426 and the first trace circuit 342 then waits for a cache miss report within a threshold time-out at 440. It is envisaged that the time to wait for a cache-miss report may vary from SoC to SoC; and may also vary with respect to how many levels of cache are implemented in the SoC. In some examples, the threshold timeout may be a hardware constant, which is a SoC design parameter and depends on how quickly the cache-controller can inform the memory subsystem about a result of a cache-search-operation.

At 442, the first trace circuit then waits and determines whether a cache miss report has been received or a timer has timed-out. If the timer has timed-out at 442, i.e., there is no cache miss report, then at 448, as the instruction was determined as a branch instruction, the existing (i.e., a non-modified) BTM message is sent to the trace IP circuit.

If at 442, the first trace circuit 342 determines that a cache miss report has been received, then a determination is made at 444 as to whether a BTM message exists (i.e., has been created at 426). If no BTM message exists at 444, then a new trace message is created, referred to as a 'vendor-defined cache miss' message at 450. The 'vendor-defined cache miss' message is preferably compressed using log compression circuit 356 that suppresses instruction trace address(es). Alternatively, if a BTM message exists at 444, then the BTM created at 426 is modified and updated at 446 to create a modified BTM. Furthermore, in some examples, a cache miss flag may be set at 446. The instruction trace address in the modified BTM is then preferably compressed by log compression circuit 356.

Concurrently, following an occurrence of an event that is a 'Fetch Instruction' at 410, the cache hit-miss trace circuit 344 performs a cache-hit-miss snoop 432. A determination is then made as to whether a Cache-missed' instruction has been received at 434. If a Cache-missed' instruction is not determined, the cache hit-miss trace circuit 344 ends at 438; otherwise, if a 'Cache-missed' instruction is identified, the cache hit-miss trace circuit 344 updates the stats and fetches the instruction address at 436 and the cache hit-miss trace circuit 344 ends at 438. However, and notably in accordance with examples of the invention, the cache hit-miss trace circuit 344 also sends a cache miss report, where the report indicates a cache miss and includes the instruction address, to the first trace circuit 342 at 439. The first trace circuit 342 adopts this instruction as one option to consider (if received) at 442, which then results in operations at 444 and 446 or 450.

Thus, in summary, once a "Fetch Instruction" event occurs at 410 at the core, then the at-least-one-layer cache 324 of FIG. 3 is able to respond with a cache hit or cache miss result. This response (either a 'hit' or 'miss') is passed to cache hit-miss trace circuit 344 via the cache-hit-miss snoop interface 332. Based on the response type (whether a 'hit' or a 'miss'), an appropriate 'hit' or 'miss' counter is increased by one by, say an "Update statistics" sub circuit, as at 436 and a cache miss report that identifies a cache miss and includes the instruction address created and passed to the first trace circuit 342 at 439.

The concepts herein described propose performing a full instruction-tracing. In an absence of understanding of the execution flow, the inventors identified that it is difficult to assign a correct address to a 'cache-miss-victim' code not least because it is impossible to know the new address that is being assigned to the cache-missed text and whether (or not) that new address is being used for some other time-critical code.

Therefore, one example of the captured instruction-trace-log is shown as follows:
  (i) Address of Instr2 (cache-miss flag=false)
  (ii) Address of Instr3 (cache-miss flag=false)
  (iii) Address of Instr4 (cache-miss flag=false)
  (iv) Address of Instr5 (cache-miss flag=true)
  (v) Address of Instr6 (cache-miss flag=true)
  (vi) Address of Instr7 (cache-miss flag=false)

Thus, the trace log according to the example concepts herein described provide a full picture of what code has been executed in the CPU, and out of the execution log an indication of those addresses that yielded a 'cache hit' and those addresses that yielded a 'cache-miss'.

It is noted that U.S. Pat. No. 5,999,721A describes a technique that only captures cache-miss events. As the teaching of U.S. Pat. No. 5,999,721A does not inform the function call graph, it is impossible to determine what else was executed in addition to 'cache-miss' instructions. Hence, a Trace log generated following the teaching of U.S. Pat. No. 5,999,721A (i.e., only identifying addresses of 'cache-miss' instructions, yields the following (for the same code)):
  (i) Address of Instr5;
  (ii) Address of Instr6.

In contrast to the trace log teaching from U.S. Pat. No. 5,999,721A, a software developer is informed of those functions that are 'cache-missed'. Thereafter, the software developer is able to decide to fix the 'cache-miss' problem for this function. The software developer would need to determine how to fix this 'cache-miss', so that this function has a 'cache-hit' in future. In order to do this, the software developer needs to change the address of the cache-missed function to some other address by modifying the linker script. If the software developer doesn't know what other functions executed at that moment (e.g., before and after the cache-victim function), the software developer will have to perform a trial and error operation to determine the best address for the cache-missed function. During these trial and error operations, the software developer will be assigning a new address to the 'cache-missed' function and needs to perform the testing again (and likely again). It is distinctly likely that during the testing procedure, the software developer may notice that some other functions have now started, which will affect the testing procedure.

In contrast, following the concepts described herein, a single trace log is generated that informs the software developer of what instructions are executed on the core and amongst those executed instructions which ones had a 'cache-miss'. Using this generated full function call graph, the software developer may be able to check which functions are executing in the flow of interest and then the software developer is able to readily assign a new address to the cache-missed function based on the full function call graph. In this manner, this full trace information allows the software developer to see, at the linking time itself, whether the new address chosen for the cache missed instruction is going to cause a 'cache-miss' for some other time-critical function.

For completeness, it is noted that four types of instructions may be theoretically created in the context of examples herein-described:
  a) Taken-branch instruction with cache-miss;
  b) Taken-branch instruction with cache-hit;
  c) Not-taken branch instruction with cache-miss;
  d) Not-taken branch instruction with cache-hit.

Existing techniques cause logging of a & b only. Notably, existing techniques do not differentiate between a & b because they don't know if these were subject to a cache 'hit' or a cache 'miss'. Examples of the present invention do provide a differentiation between 'a' and 'b' and thus are capable of creating a log for each of a, b, c.

It is envisaged that examples of the invention apply best to CPUs that have small caches as well as CPUs that execute complex time-critical software (e.g., software that supports wireless technologies like Cellular wireless, WiFi™, BT™ baseband integrated circuits). In this context, complex-software means multi-threaded code, with multiple sub-components with bounded-latencies. It is also envisaged that examples of the invention may be implemented when fine tuning a throughput performance during an advanced, later stage of a product's stability tests.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also, for example, in one embodiment, the illustrated examples may be implemented as circuitry located on a single integrated circuit or within a same device.

In some examples, the various components within an integrated circuit that comprises a central processing unit, CPU, core 322 and an integrated branch and cache hit-miss trace circuit 340 can be realized in discrete or integrated component form, with an ultimate structure therefore being an application-specific or design selection. As the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention. A skilled artisan will appreciate that the level of integration of the integrated circuit comprising a central processing unit, CPU, core 322 and an integrated branch and cache hit-miss trace circuit 340 circuits or components may be, in some instances, implementation-dependent.

Also, for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of identifying whether an instruction-fetch is a cache-missed instruction in a system on chip (SoC) architecture, the method comprising:
   sending an instruction address of a next instruction by a central processing unit (CPU) core to an at-least-one-layer cache;
   searching, by an instruction cache controller, the at-least-one-layer cache for the instruction address;
   informing, by the instruction cache controller, the CPU core whether the instruction address is present in the at-least-one-layer cache; and
   in response to an occurrence of a cache-fetch instruction:
      identifying, by a cache hit-miss trace circuit, whether the fetch instruction is a cache-missed instruction and in response to the fetch instruction being identified as a cache-missed instruction, sending a cache miss report message that includes a fetch instruction address to a first trace circuit;
      identifying, by the first trace circuit, whether the fetch instruction is a taken-branch instruction and, in response to identifying that the fetch instruction is a taken-branch instruction:

(i) creating a branch trace response message (BTM) and,
(ii) in response to receiving cache miss report from the cache hit-miss trace circuit:
creating a modified BTM that includes the fetch instruction address; and
sending the modified BTM to a create trace messages circuit wherein the modified BTM indicates an instruction address of the cache miss;
determining, by the cache hit-miss trace circuit, whether the cache-fetch instruction is a non-branch cache-miss instruction; and
in response to the fetch instruction being a non-branch cache-miss instruction, generating the cache miss report message that includes an indication of the non-branch cache-miss instruction.

2. A method of identifying whether an instruction-fetch is a cache-missed instruction in a system on chip (SoC) architecture, the method comprising:
sending an instruction address of a next instruction by a central processing unit (CPU) core to an at-least-one-layer cache;
searching, by an instruction cache controller, the at-least-one-layer cache for the instruction address;
informing, by the instruction cache controller, the CPU core whether the instruction address is present in the at-least-one-layer cache;
in response to an occurrence of a cache-fetch instruction:
identifying, by a cache hit-miss trace circuit, whether the fetch instruction is a cache-missed instruction and in response to the fetch instruction being identified as a cache-missed instruction, sending a cache miss report message that includes a fetch instruction address to a first trace circuit;
identifying, by the first trace circuit, whether the fetch instruction is a taken-branch instruction and, in response to identifying that the fetch instruction is a taken-branch instruction:
(i) creating a branch trace response message (BTM) and,
(ii) in response to receiving cache miss report from the cache hit-miss trace circuit:
creating a modified BTM that includes the fetch instruction address; and
sending the modified BTM to a create trace messages circuit wherein the modified BTM indicates an instruction address of the cache miss;
waiting, by the first trace circuit, to receive a cache miss report within a threshold time-out prior to sending instruction trace log information to the create trace messages circuit; and
adding the cache-miss address of the fetch instruction to the instruction trace log information in response to receiving the cache miss report from the cache hit-miss trace circuit within the threshold time-out.

3. A system on chip (SoC) architecture comprising:
a central processing unit (CPU) core coupled to an instruction cache controller controlling at least a one layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and
an integrated branch and cache hit-miss trace circuit operably coupled to the CPU core and comprising a first trace circuit and a cache hit-miss trace circuit;
wherein the cache hit-miss trace circuit is configured to:
in response to an occurrence of a cache-fetch instruction, identify whether the fetch instruction is a cache-missed instruction,
in response to the cache-fetch instruction being identified as a cache-missed instruction, send a cache-miss report message that includes a fetch instruction address to the first trace circuit,
determine whether the cache-fetch instruction is a non-branch cache-miss instruction, and
in response to the fetch instruction being a non-branch cache-miss instruction, generate the cache miss report message that includes an indication of the non-branch cache-miss instruction;
wherein the first trace circuit is configured to:
in response to an occurrence of the cache-fetch instruction, identify whether the cache-fetch instruction is a taken-branch instruction; and
in response to identifying that the fetch instruction is a taken-branch instruction create a branch trace message (BTM); and
in response to receiving the cache-miss report message from the cache hit-miss trace circuit, include the fetch instruction address in the BTM thereby creating a modified BTM, and send the modified BTM to a create trace messages circuit, wherein the modified BTM indicates an instruction address of the cache miss.

4. The SoC architecture of claim 3 wherein the cache miss report comprises a cache-miss flag that indicates a cache-miss of the fetch instruction address.

5. The SoC architecture of claim 3 wherein the CPU core is arranged to store the modified BTM that indicates an instruction address of the cache miss.

6. The SoC architecture of claim 3 wherein the instruction cache controller controls a multi-layer cache that comprises at least a layer-1 cache and a layer-2 cache.

7. An integrated circuit for a system on chip (SoC) architecture, the integrated circuit comprising a central processing unit, CPU, core and an integrated branch and cache hit-miss trace circuit configured according to claim 1.

8. A system on chip (SoC) architecture comprising:
a central processing unit (CPU) core coupled to an instruction cache controller controlling at least a one layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and
an integrated branch and cache hit-miss trace circuit operably coupled to the CPU core and comprising a first trace circuit and a cache hit-miss trace circuit;
wherein the cache hit-miss trace circuit is configured to:
in response to an occurrence of a cache-fetch instruction, identify whether the fetch instruction is a cache-missed instruction, and
in response to the cache-fetch instruction being identified as a cache-missed instruction, send a cache-miss report message that includes a fetch instruction address to the first trace circuit;

wherein the first trace circuit is configured to:
- in response to an occurrence of the cache-fetch instruction, identify whether the cache-fetch instruction is a taken-branch instruction;
- in response to identifying that the fetch instruction is a taken-branch instruction create a branch trace message (BTM);
- in response to receiving the cache-miss report message from the cache hit-miss trace circuit, include the fetch instruction address in the BTM thereby creating a modified BTM, and send the modified BTM to a create trace messages circuit, wherein the modified BTM indicates an instruction address of the cache miss; and
- wait to receive a cache miss report within a threshold time-out prior to sending instruction trace log information to the create trace messages circuit and add the cache-miss address of the fetch instruction to the instruction trace log information in response to receiving the cache miss report from the cache hit-miss trace circuit within the threshold time-out.

9. A system on chip (SoC) architecture comprising:
a central processing unit (CPU) core coupled to an instruction cache controller controlling at least a one layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and
an integrated branch and cache hit-miss trace circuit operably coupled to the CPU core and comprising a first trace circuit and a cache hit-miss trace circuit;
wherein the cache hit-miss trace circuit is configured to:
- in response to an occurrence of a cache-fetch instruction, identify whether the fetch instruction is a cache-missed instruction, and
- in response to the cache-fetch instruction being identified as a cache-missed instruction, send a cache-miss report message that includes a fetch instruction address to the first trace circuit;
wherein the first trace circuit is configured to:
- in response to an occurrence of the cache-fetch instruction, identify whether the cache-fetch instruction is a taken-branch instruction;
- in response to identifying that the fetch instruction is a taken-branch instruction create a branch trace message (BTM); and
- in response to receiving the cache-miss report message from the cache hit-miss trace circuit, include the fetch instruction address in the BTM thereby creating a modified BTM, and send the modified BTM to a create trace messages circuit, wherein the modified BTM indicates an instruction address of the cache miss;
wherein the CPU core stores the modified BTM that indicates an instruction address of the cache miss such that it is accessible for analysis a device external to the SoC to identify which code was executed during time-critical phases of the instruction-tracing period and which code incurred instruction misses.

10. A system on chip (SoC) architecture comprising:
a central processing unit (CPU) core coupled to an instruction cache controller controlling at least a one layer cache, wherein in response to receiving an instruction address of a next instruction from the CPU core the instruction cache controller is configured to search the at-least-one-layer cache for the instruction address and inform the CPU core whether the instruction address is present in the at-least-one-layer cache; and
an integrated branch and cache hit-miss trace circuit operably coupled to the CPU core and comprising a first trace circuit and a cache hit-miss trace circuit;
wherein the cache hit-miss trace circuit is configured to:
- in response to an occurrence of a cache-fetch instruction, identify whether the fetch instruction is a cache-missed instruction, and
- in response to the cache-fetch instruction being identified as a cache-missed instruction, send a cache-miss report message that includes a fetch instruction address to the first trace circuit;
wherein the first trace circuit is configured to:
- in response to an occurrence of the cache-fetch instruction, identify whether the cache-fetch instruction is a taken-branch instruction;
- in response to identifying that the fetch instruction is a taken-branch instruction create a branch trace message (BTM); and
- in response to receiving the cache-miss report message from the cache hit-miss trace circuit, include the fetch instruction address in the BTM thereby creating a modified BTM, and send the modified BTM to a create trace messages circuit, wherein the modified BTM indicates an instruction address of the cache miss;
wherein the integrated branch and cache hit-miss trace circuit is operably coupled to a second trace circuit that comprises debug configuration registers and the create trace messages circuit that is configured to include at least one bit that indicates a cache-miss and enables a debugger to perform cache-miss tracing.

11. The SoC architecture of claim 10, wherein the second trace circuit comprises a log compression circuit, operably coupled to the first trace circuit, and configured to suppress instruction trace address(es) for non-branch trace message cache-miss instructions.

12. The SoC architecture of claim 11, wherein the log compression circuit is operably coupled to on-chip memory, configured to receive an address of the cache miss from the log compression circuit, and to store the address.

13. The SoC architecture of claim 11, wherein the log compression circuit is configured to suppress at least one of: a cache miss address's least significant bits (LSB) and a cache miss address's most significant bits (MSB) to align with a cache-line-size of the on-chip memory.

* * * * *